United States Patent [19]

Frey

[11] Patent Number: 5,748,440
[45] Date of Patent: May 5, 1998

[54] LARGE KEY CALCULATOR AND MOUNT

[76] Inventor: Lyndsy J. Frey, 24112 NE. 364 St., Yacolt, Wash. 98675

[21] Appl. No.: 632,740

[22] Filed: Apr. 15, 1996

[51] Int. Cl.[6] .................. G06F 1/16; H05K 7/14
[52] U.S. Cl. .............. 361/683; 248/205.1; 235/61 A
[58] Field of Search ........................ 361/683, 680, 361/679, 681; 235/61 A; 248/201, 205.1, 205.3, 225.31, 247; 364/708.1

[56] References Cited

U.S. PATENT DOCUMENTS

| | | |
|---|---|---|
| D. 285,934 | 9/1986 | Yoshioka et al. . |
| D. 294,152 | 2/1988 | Kuo . |
| D. 317,775 | 6/1991 | Lerude et al. . |
| D. 319,252 | 8/1991 | Sawada et al. . |
| D. 343,187 | 1/1994 | Webb et al. . |
| D. 348,896 | 7/1994 | Kumar et al. . |
| 4,157,588 | 6/1979 | Ebihara et al. . |
| 4,814,759 | 3/1989 | Gombrich et al. .......... 340/771 |
| 5,176,392 | 1/1993 | Graebe et al. .......... 280/33.992 |
| 5,262,762 | 11/1993 | Westover et al. .......... 345/168 |
| 5,544,040 | 8/1996 | Gerbaulet .......... 364/401 R |

OTHER PUBLICATIONS

Signatures flyer, Apr. 1989, Pen and Calculator set.
Signatures flyer, ©1990; three ring binder Calculator.
Hong Kong Enterprise; Oct. 1989, p. 141; 3 pen and calculator set, #BM-303 middle page.

*Primary Examiner*—Lynn D. Feild
*Attorney, Agent, or Firm*—Marger, Johnson, McCollom & Stolowitz,PC

[57] ABSTRACT

The mountable calculator comprises a calculator body having a rectangular front wall and a substantially flat back wall connected by opposing lateral sides and opposing longitudinal sides. The front wall is positioned over and spaced apart from the back wall to provide a space therebetween. Calculator has a plurality of numeric keys and a plurality of function keys defined on the front wall. To improve use for the visually challenged, the numeric and function keys are sized greater then the fingertip size of an average user. Electronics are disposed within the calculator body and are operatively connected to the numeric and function keys. A display screen for displaying numbers relating to the operation of the calculator is also operatively connected to the electronics. Finally, the calculator can be mounted using first and second lateral wings which integrally formed or separate from the calculator body. The mounting wings extend from opposing sides the body and have a screw receiving bore therethrough for screwing the wings to a surface. The wings can be arcuately shaped or square shaped.

11 Claims, 3 Drawing Sheets

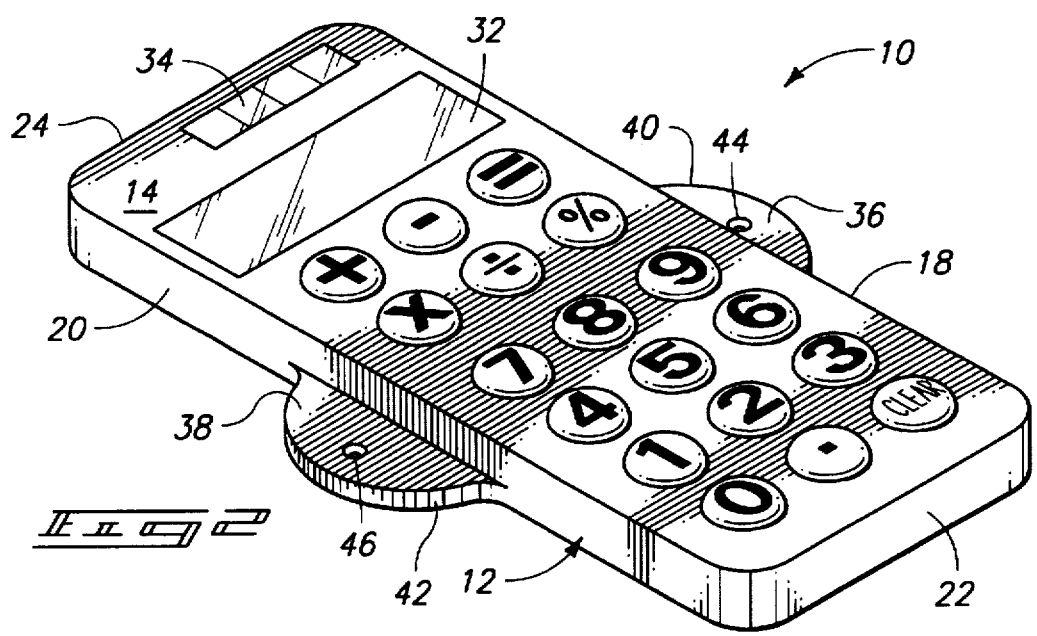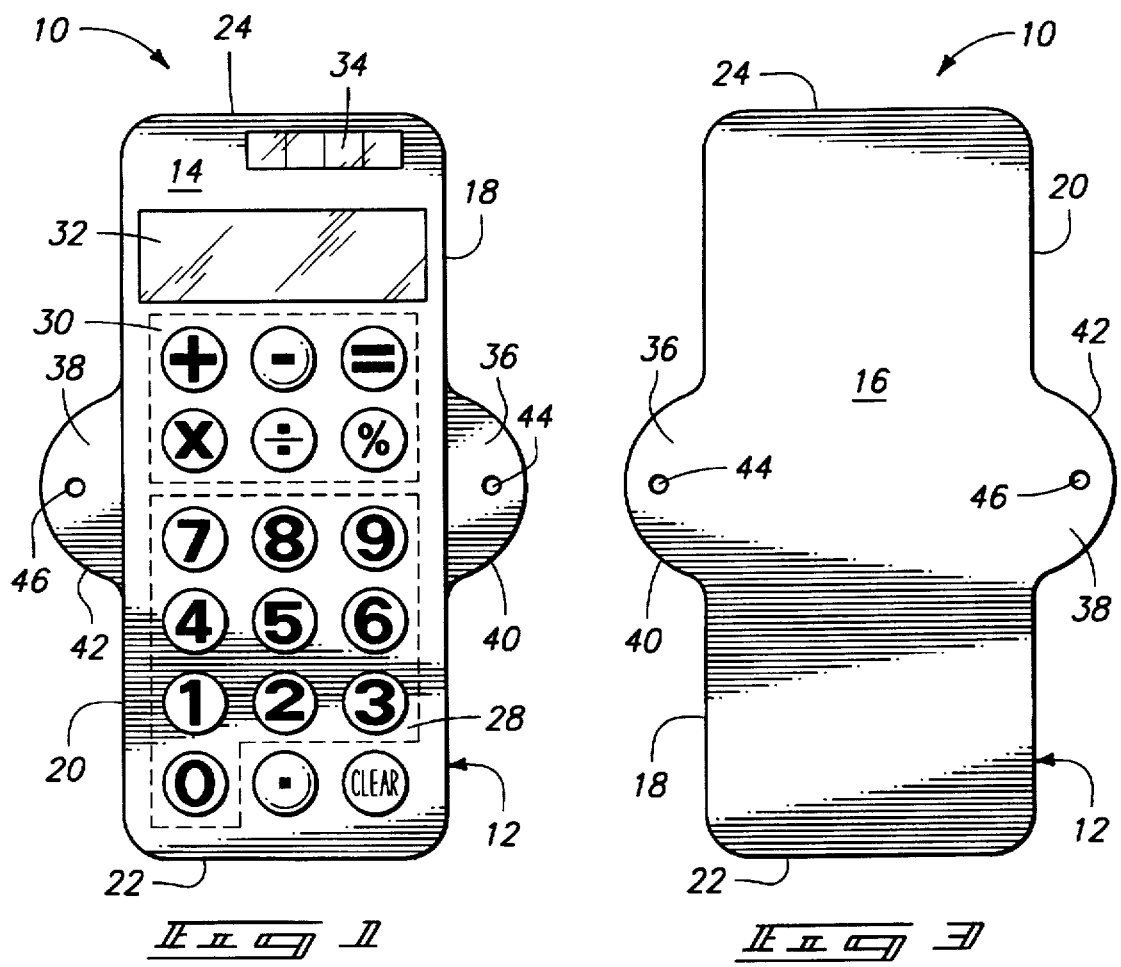

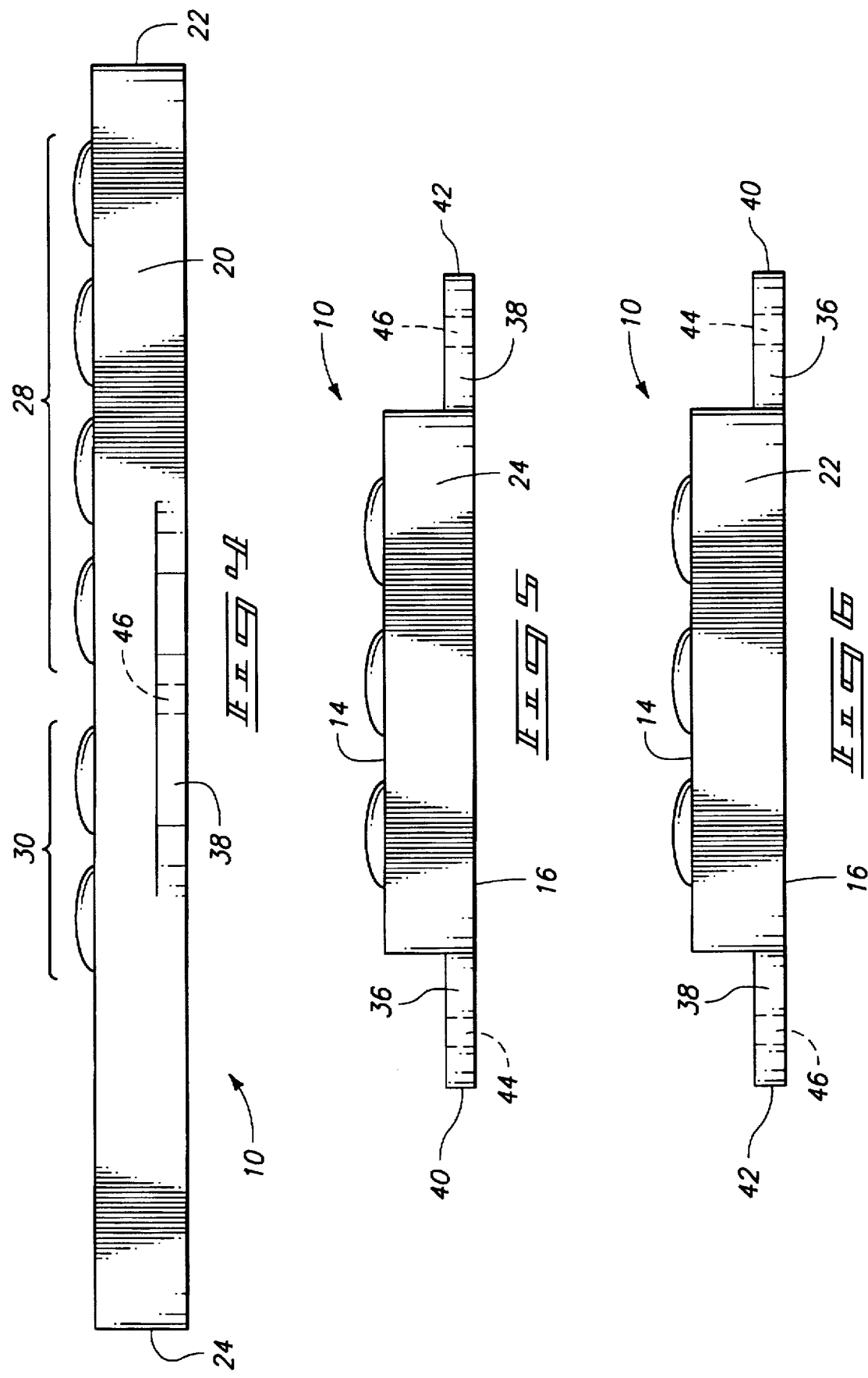

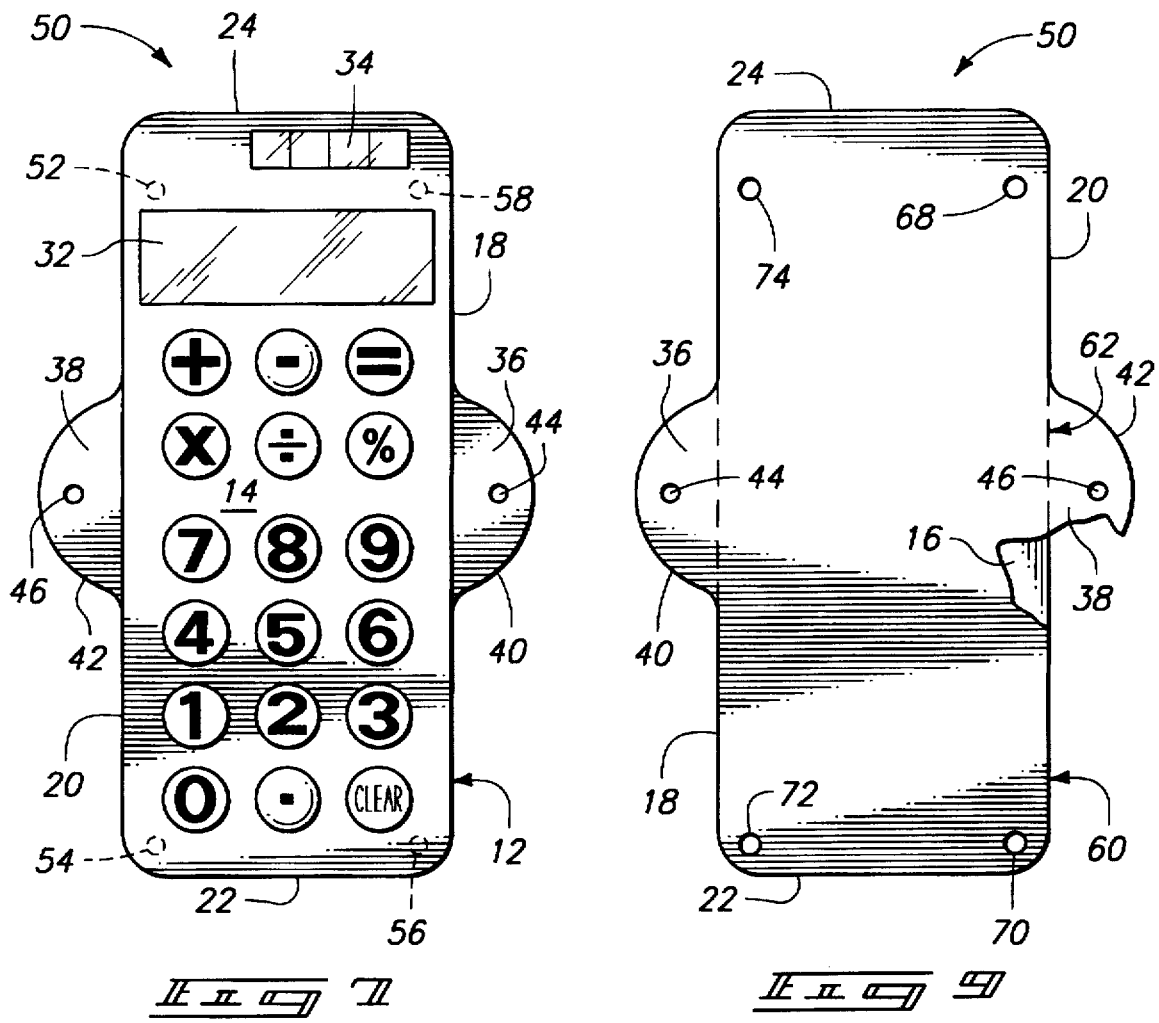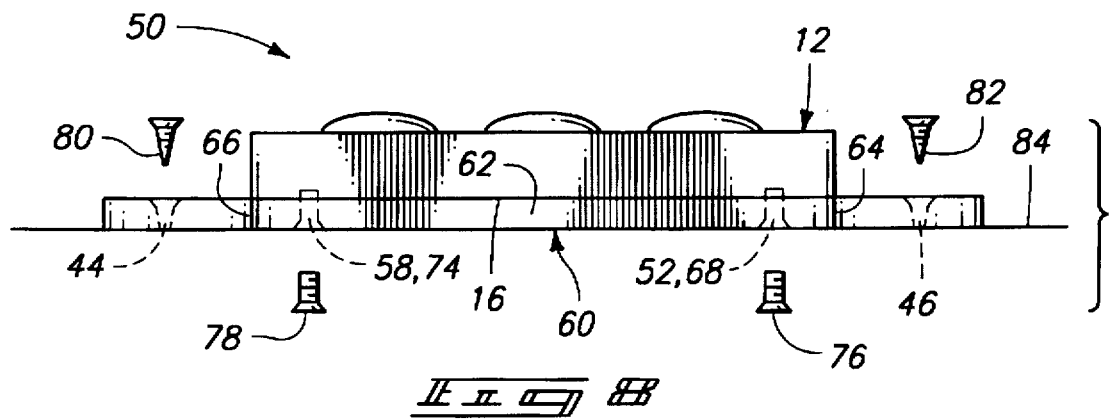

LARGE KEY CALCULATOR AND MOUNT

BACKGROUND OF THE INVENTION

This invention relates generally to calculators and more particularly to a mountable calculator which may be securely and easily used by banking and shopping customers to make simple calculations.

Advancements in the electronics arts has made calculators both smaller and more powerful. For instance, one of original Texas Instruments hand-held calculators from the 1960s included a plurality of functions, including addition, subtraction, multiplication, division, and for the first time, square root. The calculator was too large and heavy to carry in the user's pocket. A modern calculator, such as the TI-68S is approximately one tenth the size, has approximately 50 times the number of functions, and costs a tenth of the price of the earlier TI calculator. This has been a boon for more technical uses. However, the modern calculator can become unwieldy for simpler uses such as balancing ones checkbook at the bank. Additionally, the size of the numeric and function keys has been reduced so that it is difficult for elderly users to easily use the keypad of the calculator, much less use it.

Another feature of modern calculators is that they are easily transportable. Though this is a boon to owners of the calculators, it make the calculator easier to steal or just forget and put in one's pocket.

Accordingly, the need exists for a calculator having large easy-to-read numeric and function keys and that also cannot be readily carried off.

SUMMARY OF THE INVENTION

It is, therefore, an object of the invention to provide numeric and function keys that are easy to use.

Another object of the invention is to secure a calculator in a stable working environment and to prevent theft of the calculator.

The calculator constructed according to the present invention comprises a calculator body having a rectangular front wall and a substantially flat back wall connected by opposing lateral sides and opposing longitudinal sides. The front wall is positioned over and spaced apart from the back wall to provide a space therebetween. Calculator has a plurality of numeric keys and a plurality of function keys defined on the front wall. To improve use for the visually challenged, the numeric and function keys are sized greater then the fingertip size of an average user. Electronics are disposed within the calculator body and are operatively connected to the numeric and function keys. A display screen for displaying numbers relating to the operation of the calculator is also operatively connected to the electronics. Finally, the calculator can be mounted on a surface such as a table or wall using first and second lateral wings which integrally formed or separate from the calculator body. The mounting wings extend from opposing sides the body and have a screw receiving bore therethrough for screwing the wings to a surface.

An alternate embodiment of the calculator and mount includes a separable calculator body and planar mounting plate each having sets of screw receiving bores which can be aligned for attaching the calculator and mount together. In particular, the mounting plate is attached to the back wall of the calculator body and has a rectangular main body of a size and shape substantially similar to said calculator back wall. The mounting plate further has first and second wings extending from opposing edges of the main body in the plane of the plate. Screw receiving holes defined through the mounting plate are aligned with a corresponding plurality of screw receiving bores on the back wall of the calculator body. A second set of screw receiving bores are defined through the first and second wings for mounting the plate and attached calculator body to a surface.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a plan view showing the front side of calculator constructed according to the invention.

FIG. 2 is a perspective view of the calculator of FIG. 1.

FIG. 3 is a plan view showing the backside of the calculator of FIG. 1.

FIG. 4 is a left side elevation view of the calculator of FIG. 1, the right side being a mirror image of the left.

FIG. 5 is a top view of the calculator of FIG. 1.

FIG. 6 is a bottom view of the calculator of FIG. 1.

FIG. 7 is a plan view showing the front side of an alternate embodiment of the invention.

FIG. 8 is a top view of the calculator and mount invention shown in FIG. 7.

FIG. 9 is a back view of calculator and mount shown in FIG. 7.

DETAILED DESCRIPTION

FIG. 1 shows the calculator constructed according to the invention at 10. Calculator 10 includes a calculator body 12 having a rectangular front wall 14 and a substantially flat back wall 16 connected by opposing lateral sides 18,20 and opposing longitudinal sides 22,24 so that the front wall 14 is positioned over and spaced from the back wall 16 to define a space 26 therebetween.

Calculator 10 has a plurality of numeric keys (grouped within the dashed lines as 28) which generally run from the number zero to nine as in conventional calculators. A plurality of function keys (grouped within the dashed lines as 30) are also included. The numeric and function keys are sized in one embodiment of the invention to be greater than the fingertip size of an average user and are spaced apart to prevent a user from mis-hitting a single key or hitting more than one key at a time. The key size has the advantage in that users having poor eyesight or shaky hands can operate the calculator easily and without mishap. Though the keys 28,30 are circular, it is understood that other shapes such as square-shaped or plural-shaped keys, are envisioned. Key size is one the order of about ¾" and separation between the center of each key should be about 1". FIG. 1 depicts the actual size of the preferred embodiment, having a length between opposing longitudinal sides 22,24 of about 7" and a width between opposing lateral sides 18,20 of about 3".

Electronic means are disposed within the space 26 defined between front and back calculator walls 16, 18 to operatively connect the numeric and function keys 28, 30 to the display screen 32. The electronic means can be any electrons conventional in the art. Display screen 32 is typically an LCD screen which has a numeric display approximately equal in size to the numeric keys in order to be easily read. The embodiment shown in FIG. 1 shows an array of solar cells 34 which power the calculator 10 although other means are possible.

Calculator 10 may be mounted onto a surface via first and second wings 36,38. As shown in FIGS. 1 and 4–7, wings 36,38 extend laterally from right and left lateral sides 18,20 although it is possible to construct the invention having wings extending from bottom and top longitudinal sides 22,24. Wings 36,38 have an arcuately curved outer edge shown at 40,42 respectively. The invention is not limited to this embodiment since alternate shapes and sizes can be used with equal success such as a square shape running the length of the lateral sides etc. Wings 36,38 each have a screw receiving bore, shown at 44 and 46 respectively, defined therethrough. To mount calculator 10, the calculator is positioned over the surface to be mounted and screws or other attachment means such as pins, tacks, staples are inserted through the bores and into the surface.

An alternate embodiment of the invention illustrating a calculator and mount assembly is shown in FIGS. 7–9 at 50. The assembly includes a calculator body constructed almost identically to that described above with a few important distinctions. The back wall of the calculator (shown at 16 in FIG. 8) has a plurality of screw receiving bores 52,54, 56 and 58 defined therethrough. The back wall 16 of the calculator is proportionately sized to the front wall 14 similar to a conventional calculator.

Assembly 50 includes a substantially planar mounting plate 60 attached to the back wall 16 of the calculator body 12. The mounting plate has a rectangular main body 62 of a size and shape substantially similar to the calculator back wall and further has first and second wings 36, 38 extending from opposing edges (here lateral edges 64,66) of the main body of the plate. Wings 36, 38 each have a screw receiving bore, shown at 44 and 46 respectively, defined therethrough. Plate 60 has a first set of screw receiving holes aligned 68,70,72 and 74 aligned with their respective screw receiving bores 52,54,56 and 58 of the calculator back wall.

To attach the assembly to a planar surface, the bores on the calculator back side and the holes on the mounting plate must be aligned. Once the bores and holes are aligned, screws (such as screws 76 and 78) are received within the aligned holes and bores, thus attaching the calculator and mounting plate together. Although screws 76,78 are shown entering the holes and bores from a bottom side, it is envisioned that bores 52,54,56 and 58 may pass completely through the calculator body so that the screws may be fastened from the front wall 14 downward.

A second set of screws (such as screws 80,82) may be received within bores 44,46 respectively and screwed into a planar surface 84. All forward facing screws can have an allen wrench receiving slot to make it more difficult for a thief to remove the calculator once mounted.

Having described and illustrated the principles of the invention in a preferred embodiment thereof, it should be apparent that the invention can be modified in arrangement and detail without departing from such principles. For instance, the means for connecting the back wall of the calculator to the planar surface, such as a wall or desk next to a bank teller, can be located completely within the calculator body as by affixing the back wall of the calculator to the planar surface and affixing the remainder of the calculator body to the back wall. I claim all modifications and variation coming within the spirit and scope of the following claims.

I claim:

1. A mountable calculator comprising:

a calculator body having a rectangular front wall and a back wall connected by opposing lateral sides and opposing longitudinal sides, said front wall positioned over and spaced from said back wall to provide a space therebetween;

a plurality of numeric keys;

a plurality of function keys, said numeric and function keys disposed on a front wall of body and sized greater then the fingertip size of an average user;

electronics means disposed in the space and operatively connected to said numeric and said function keys;

a display screen operatively connected to said electronics means for displaying numbers relating to the operation of the calculator;

means for connecting the back wall of the calculator body to a flat surface, wherein the means for connecting the back wall of the calculator body to a flat surface includes first and second wings integrally formed with said calculator body and extending from opposing sides said body, each of said wings having a screw receiving bore therethrough for screwing the wings to a surface.

2. The mountable calculator of claim 1, wherein the first and second lateral wings have arcuately curved outer edges.

3. The mountable calculator of claim 1, wherein the first and second lateral wings have squared-off outer edges.

4. The mountable calculator of claim 1, wherein the wings extend centrally from opposing lateral sides of said body.

5. The mountable calculator of claim 1, wherein the wings extend centrally from opposing longitudinal sides of said body.

6. A mountable calculator comprising:

a calculator body having a rectangular front wall and a back wall connected by opposing lateral sides and opposing longitudinal sides, said front wall positioned over and spaced from said back wall to provide a space therebetween;

a plurality of numeric keys;

a plurality of function keys, said numeric and function keys disposed on a front wall of body and sized greater then the fingertip size of an average user;

electronics means disposed in the space and operatively connected to said numeric and said function keys;

a display screen operatively connected to said electronics means for displaying numbers relating to the operation of the calculator;

means for connecting the back wall of the calculator body to a flat surface, wherein said back wall has a plurality of screw receiving bores, the calculator further including:

a substantially planar mounting plate attached to the back wall of the calculator body, said mounting plate having a rectangular main body of a size and shape substantially similar to said calculator body back wall and further having first and second wings extending from opposing edges of the main body in the plane of the plate, said plate having a first set of screw receiving holes aligned with the plurality of screw receiving bores on the back wall of the calculator body and second set of screw receiving bores through the first and second wings.

7. The mountable calculator of claim 6, wherein the first and second lateral wings have arcuately curved outer edges.

8. The mountable calculator of claim 6, wherein the first and second lateral wings have squared-off outer edges.

9. The mountable calculator of claim 6, wherein the screw receiving bores in the rectangular back wall of the calculator body are located substantially adjacent to the corners of the back wall.

10. A mountable calculator comprising:

a calculator body having a rectangular front wall and a back wall connected by opposing lateral sides and opposing longitudinal sides, said front wall positioned over and spaced from said back wall to provide a space therebetween;

a plurality of numeric keys;

a plurality of function keys, said numeric and function keys disposed on a front wall of body and sized greater then the fingertip size of an average user;

electronics means disposed in the space and operatively connected to said numeric and said function keys;

a display screen operatively connected to said electronics means for displaying numbers relating to the operation of the calculator;

means for connecting the back wall of the calculator body to a flat surface, wherein the means for connecting includes a plurality of screw receiving bores defined through the back wall of the calculator body.

11. A method for mounting a calculator onto a planar surface comprising:

providing a calculator body having a back wall, said back wall having a plurality of screw receiving bores therethrough;

providing a mounting plate having a plurality of screw receiving holes aligned with the screw receiving bores and first and second wings extending from opposing edges of said mounting plate, each wing having a mounting bore therethrough;

aligning the screw receiving holes in the mounting plate with the screw receiving bores in the calculator back wall;

screwing the mounting plate to the calculator body via the aligned holes in the mounting plate with the screw receiving bores in the calculator back wall; and screwing the mounting plate onto a planar surface via the bores through the first and second wings.

* * * * *